US007881981B2

(12) United States Patent
Taylor et al.

(10) Patent No.: US 7,881,981 B2
(45) Date of Patent: Feb. 1, 2011

(54) METHODS AND COMPUTER READABLE MEDIA FOR DETERMINING A MACRO-CONTEXT BASED ON A MICRO-CONTEXT OF A USER SEARCH

(75) Inventors: David C. Taylor, Mapleton, UT (US); Ronald L. Hall, Jr., Laguna Beach, CA (US)

(73) Assignee: Yoogli, Inc., Costa Mesa, CA (US)

( * ) Notice: Subject to any disclaimer, the term of this patent is extended or adjusted under 35 U.S.C. 154(b) by 861 days.

(21) Appl. No.: 11/745,346

(22) Filed: May 7, 2007

(65) Prior Publication Data
US 2007/0255735 A1 Nov. 1, 2007

Related U.S. Application Data

(63) Continuation of application No. 09/630,753, filed on Aug. 2, 2000, now Pat. No. 7,219,073.

(60) Provisional application No. 60/146,878, filed on Aug. 3, 1999.

(51) Int. Cl.
*G06Q 30/00* (2006.01)
(52) U.S. Cl. .................. 705/26.1; 705/26.41; 705/27.1; 707/600; 707/601; 707/602; 707/603; 707/604; 707/605; 707/606; 707/607
(58) Field of Classification Search ............. 705/26–27; 707/600–607
See application file for complete search history.

(56) References Cited
U.S. PATENT DOCUMENTS
4,849,898 A * 7/1989 Adi .................................. 1/1

5,265,065 A * 11/1993 Turtle ................................. 1/1

(Continued)

FOREIGN PATENT DOCUMENTS
EP        1217542 A      6/2002

(Continued)

OTHER PUBLICATIONS iMALL, Inc. and Mindmaker, Inc. Team Up to Enhance Stuff.com Shopping and Search Capabilities. PR Newswire , p. 4300 , Apr. 20 1999.*

(Continued)

*Primary Examiner*—William Allen
(74) *Attorney, Agent, or Firm*—Pate Baird, PLLC

(57) ABSTRACT

A data extraction tool is provided for cataloging information in an information source for searching by a user. The tool mines information from the information source and organizes the information, or the locations of that information, within a database. A user may then query the tool for a desired type of information. The tool filters the database to provide a set of pinpoint site locations with information of the type requested in the query. These pinpoint site locations are presented to a user and indexed for future reference. The index of site locations may be updated automatically by the tool. A context system is provided for manually or automatically determining the proper context for a user's query. Thus, the data extraction tool provides information with a high probability of relevance to the user. The user obtains the information without expending much effort to refine the search.

10 Claims, 17 Drawing Sheets

U.S. PATENT DOCUMENTS

| | | | | |
|---|---|---|---|---|
| 5,404,505 | A | 4/1995 | Levinson | 395/600 |
| 5,537,132 | A | 7/1996 | Teraoka et al. | 345/133 |
| 5,576,954 | A * | 11/1996 | Driscoll | 1/1 |
| 5,649,186 | A | 7/1997 | Ferguson | 395/610 |
| 5,655,116 | A | 8/1997 | Kirk et al. | 395/601 |
| 5,664,115 | A | 9/1997 | Fraser | 705/37 |
| 5,708,825 | A | 1/1998 | Sotomayor | 395/762 |
| 5,724,571 | A | 3/1998 | Woods | 395/605 |
| 5,737,619 | A | 4/1998 | Judson | 395/761 |
| 5,754,939 | A * | 5/1998 | Herz et al. | 455/3.04 |
| 5,758,328 | A | 5/1998 | Giovavnnoli | 705/26 |
| 5,794,207 | A | 8/1998 | Walker et al. | 705/23 |
| 5,796,945 | A | 8/1998 | Tarabella | 395/200.9 |
| 5,832,520 | A | 11/1998 | Miller | 707/203 |
| 5,873,079 | A | 2/1999 | Davis, III et al. | 707/3 |
| 5,895,454 | A | 4/1999 | Harrington | 705/26 |
| 5,901,287 | A | 5/1999 | Bull et al. | 395/200.48 |
| 5,905,988 | A | 5/1999 | Schwartz et al. | 707/104 |
| 5,913,210 | A | 6/1999 | Call | 707/4 |
| 5,918,213 | A | 6/1999 | Bernard et al. | 705/26 |
| 5,926,808 | A | 7/1999 | Evans et al. | |
| 5,933,827 | A | 8/1999 | Cole et al. | |
| 5,946,488 | A | 8/1999 | Tanguay et al. | |
| 6,021,409 | A | 2/2000 | Burrows | 707/102 |
| 6,029,165 | A | 2/2000 | Gable | 707/3 |
| 6,073,167 | A | 6/2000 | Poulton et al. | 709/206 |
| 6,125,352 | A | 9/2000 | Franklin et al. | 705/26 |
| 6,134,532 | A | 10/2000 | Lazarus et al. | 705/14 |
| 6,175,830 | B1 | 1/2001 | Maynard | 707/5 |
| 6,256,633 | B1 | 7/2001 | Dharap | |
| 6,260,077 | B1 | 7/2001 | Rangarajan et al. | 709/328 |
| 6,289,342 | B1 | 9/2001 | Lawrence et al. | 707/7 |
| 6,314,420 | B1 | 11/2001 | Lang et al. | 707/3 |
| 6,397,209 | B1 | 5/2002 | Reed et al. | |
| 6,421,675 | B1 | 7/2002 | Ryan et al. | |
| 6,438,539 | B1 | 8/2002 | Korolev et al. | 707/3 |
| 6,745,161 | B1 | 6/2004 | Arnold et al. | |
| 6,760,720 | B1 | 7/2004 | De Bellis | |
| 7,007,014 | B2 * | 2/2006 | Liu et al. | 707/758 |
| 7,013,300 | B1 * | 3/2006 | Taylor | 1/1 |
| 7,194,483 | B1 * | 3/2007 | Mohan et al. | 707/600 |
| 7,219,073 | B1 * | 5/2007 | Taylor et al. | 705/26 |
| 7,330,846 | B1 * | 2/2008 | Dirisala et al. | 707/754 |
| 2002/0129341 | A1 | 9/2002 | Hibdon | |
| 2003/0236710 | A1 * | 12/2003 | Tong et al. | 705/26 |
| 2005/0071328 | A1 | 3/2005 | Lawrence | |

FOREIGN PATENT DOCUMENTS

| | | |
|---|---|---|
| GB | 2336696 | 10/1999 |
| WO | WO 96/23265 | 1/1995 |
| WO | WO 98/26357 | 6/1998 |

OTHER PUBLICATIONS

Jussi Karlgren et al., "The glass box user model for filtering," Feb. 1994, 12 pages.

"Taxonomized Web Search" IBM Technical Disclosure Bulletin, May 1997, vol. 40 No. 05.

Sonia Bergamaschi et al., "An approach for the extraction of information from the heterogeneous sources of textual data," Knowledge representation meets databases, proceedings of the $4^{th}$ KRDB workshop, Aug. 1997, pp. 1-7.

Yoshihiko Hayashii et al., "Searching text-rich XML documents with relevance ranking," ACM SIGIR 2000 workshop on XML and information retrieval, Jul. 28, 2000, 7 pages.

Xiaoli Li, *Using Micro Information Units for Internet Search*, Proceedings of the Eleventh Internation Conference on Information and Knowledge Management, 2002, pp. 566-576.

Text Search, 1997-2004, pp. 1-2, www.microset.com/search.

Curt Franklin, *How Internet Search Engines Work Looking At the Web*, Aug. 12, 2003, pp. 1-3, http://computer.howstuffworks.com/search-engine1.htm.

Curt Franklin, *How Internet Search Engines Work Building the Index*, Aug. 12, 2003, pp. 1-3, http://computer.howstuffworks.com/search-engine2.htm.

Curt Franklin, *How Internet Search Engines Work Building a Search*, Aug. 12, 2003, pp. 1-3, http://computer.howstuffworks.com/search-engine3.htm.

Curt Franklin, *How Internet Search Engines Work Future Search*, Aug. 12, 2003, pp. 1-3, http://computer.howstuffworks.com/search-engine4.htm.

Froogle.com, *About Froogle What Exactly Is Froogle?*, Aug. 12, 2003, pp. 1-3, http://froogle.google.com/froogle/about.html.

Curt Franklin, *How Internet Search Engines Work*, Jun. 7, 2004, pp. 1-6, http://computer.howstuffworks.com/search-engine.htm/printable.

Ashwin G. Rao et al., "Experiments in query processing at Lexis-Nexis for TrDC-7," no date, 10 pages.

* cited by examiner

METHODS AND COMPUTER READABLE MEDIA FOR DETERMINING A MACRO-CONTEXT BASED ON A MICRO-CONTEXT OF A USER SEARCH

RELATED U.S. APPLICATIONS

This application is a continuation of U.S. patent application Ser. No. 09/630,753, filed Aug. 2, 2000 now U.S. Pat. No. 7,219,073, which claims the benefit of U.S. Provisional Patent Application Ser. No. 60/146,878, filed Aug. 3, 1999. U.S. patent application Ser. No. 09/630,753 and U.S. Provisional Patent Application Ser. No. 60/146,878 are incorporated herein by reference.

BACKGROUND OF THE INVENTION

1. The Field of the Invention

This invention relates to a data extraction tool and, more particularly, to novel systems and methods for organizing and presenting information about products for sale over the Internet for a user.

2. The Relevant Technology

In what is known as the information age, information is readily available electronically, through information repositories known as datastores and databases. Datastores are substantially unorganized collections of data, while databases are indexed in some fashion. The Internet, the world's largest database, has made available enormous quantities of information to anyone with a personal computer and Internet access. This can be very helpful for people who wish to learn about something or conduct business in the convenience of their own homes. However, it can also be tremendously time-consuming to locate a desired bundle of information among the millions available.

The Internet is organized only by the name of each web site. Each individual or group maintaining a web site decides how that web site will be organized. Thus, there is no official catalog of information available on the Internet. Anyone desiring information must hypothesize which web sites would be likely to have the desired data and navigate through those web sites according to the organization set up by the web site's operator. Although other databases and datastores are small, many exhibit the same organizational difficulties.

Some companies have developed portals to automate a portion of the search for information. Most of these portals are text-based. Currently available portals include search engines, and directories.

To use a search engine, a user provides a set of words to search for, and the search engine returns a list of "hits," or web sites containing those words. Search engines are advantageous in that they require little user input or understanding of the operation of the search engine. However, they can be difficult to work with for a number of reasons.

For example, the list may contain a vast number of hits, few of which actually relate to the desired piece of data. Conventional keyword searching returns any instance of the word being sought, regardless of the way the word is used in the web site. Although a user may add additional keywords to narrow the search, there often is no combination of words that must be found together to exclude all irrelevant pages while keeping all relevant ones.

Also, many conventional search engines return only the home page of a web site that contains the keyword. It is then up to the user to find the keyword in a site and determine whether it is relevant. This requires a user to figure out how the site is organized and follow the right links. This can be difficult because there may be no links that clearly indicate where the keyword is.

The output from most search engines is simply a page of links to possibly relevant sites. A user may wish to supplement or rearrange the search results, but the way the results of a search are formatted typically makes addition or modification of criteria difficult or impossible.

Moreover, information obtained through a search often becomes outdated. Currently, a user must revisit previously found sites to determine whether the old information is still valid. Additionally, a user must perform a new search to locate any newly relevant sites and search through those sites for relevant information.

Directories function differently than search engines. Rather than search based on keywords provided by a user, most directories provide a user with an information scheme, often hierarchically organized. The user then chooses what type of information to search for, designating narrower groups of information with each choice. Ultimately, the user reaches the bottom level of the hierarchy and receives a list of links to information within that level.

Directories are advantageous in that information concerning a certain topic is typically grouped together. A directory probably will not inundate a user with information, but rather provide a few links believed to be important by the creators of the directory. Nevertheless, directories have drawbacks of their own.

For example, traditional directories contain information deemed of value by those who compile them. A user may have an entirely different view of what is important and what is irrelevant. A user may thus find that information he or she needs simply is not available on the directory.

Also, directories take time to navigate. A user must make a series of decisions to reach any useful information at all. Even then, a user may find it necessary to backtrack and choose a different route through the hierarchy. Since a user cannot fashion groupings of information, he or she may be required to view several branches of the hierarchy to obtain the full range of information he or she desires.

Moreover, if a user does not know how to classify the bit of information sought, he or she may not even be able to find it in the directory. For example, a user desiring to find the meaning of "salmonella" in a biological directory may spend great amounts of time looking through the "aquatic life" branch of the directory, without ever realizing that "salmonella" is more properly classified as "microscopic life." The more a user's view of how information should be organized differs form that of the directory's creators, the more difficult it will be for the user to find information in the directory.

Consequently, there is a need for a data extraction tool capable of providing many of the benefits of both search engines and directories, without drawbacks listed above. For example, there is a need for a tool that could reliably provide a list of highly relevant information locations based on a simple text query. Furthermore, such a tool should provide ready access to the exact location of the information. Preferably, the tool would supply the user with a list of locations or links that can be easily sorted and updated for the convenience of the user. Furthermore, the tool should not require that the user understand the configuration of the tool's internal databases.

In addition to the problems mentioned above, current searching methods are deficient in a number of other ways. Consequently, a more advanced data extraction tool may provide numerous benefits to those desiring to obtain information from a large datastore or database, such as the Internet.

OBJECTS AND BRIEF SUMMARY OF THE INVENTION

In view of the foregoing, it is a primary object of the present invention to provide a data extraction tool capable of context-sensitive searching, pinpointing, databasing, automatically updating information, or any combination thereof, from a datastore or database. Consistent with the foregoing object, and in accordance with the invention as embodied and broadly described herein, an apparatus and method are disclosed, in suitable detail to enable one of ordinary skill in the art to make and use the invention. In certain embodiments, an apparatus and method in accordance with the present invention may be directed to locating prices for products that can be purchased over the Internet.

Selected embodiments of the invention have modules for mining, databasing, searching, filtering, pinpointing, presenting, indexing, or updating information for a user, or some combination thereof. According to some embodiments, the data extraction tool mines information from the information source and organizes the locations of that information within a local database. Then, a user may query the tool for a desired type of information. The tool filters the local database to provide a set of pinpoint site locations with information of the type requested in the query. These pinpoint site locations are presented to a user and indexed for future reference. The index of site locations may be updated automatically by the tool.

A context system is provided for manually or automatically determining the proper context for a user's query. Thus, the data extraction tool provides information with a high probability of relevance to the user. The user obtains the information without expending much effort to refine the search.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of methods and apparatus in accordance with the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 17, is not intended to limit the scope of the invention, as claimed, but is merely representative of presently preferred embodiments of the invention.

Those of ordinary skill in the art will, of course, appreciate that various modifications to the details of the figures may easily be made without departing from the essential characteristics of the invention. Thus, the following description of the figures is intended only by way of example, and simply illustrates certain presently preferred embodiment consistent with the invention as claimed.

Figure 1:
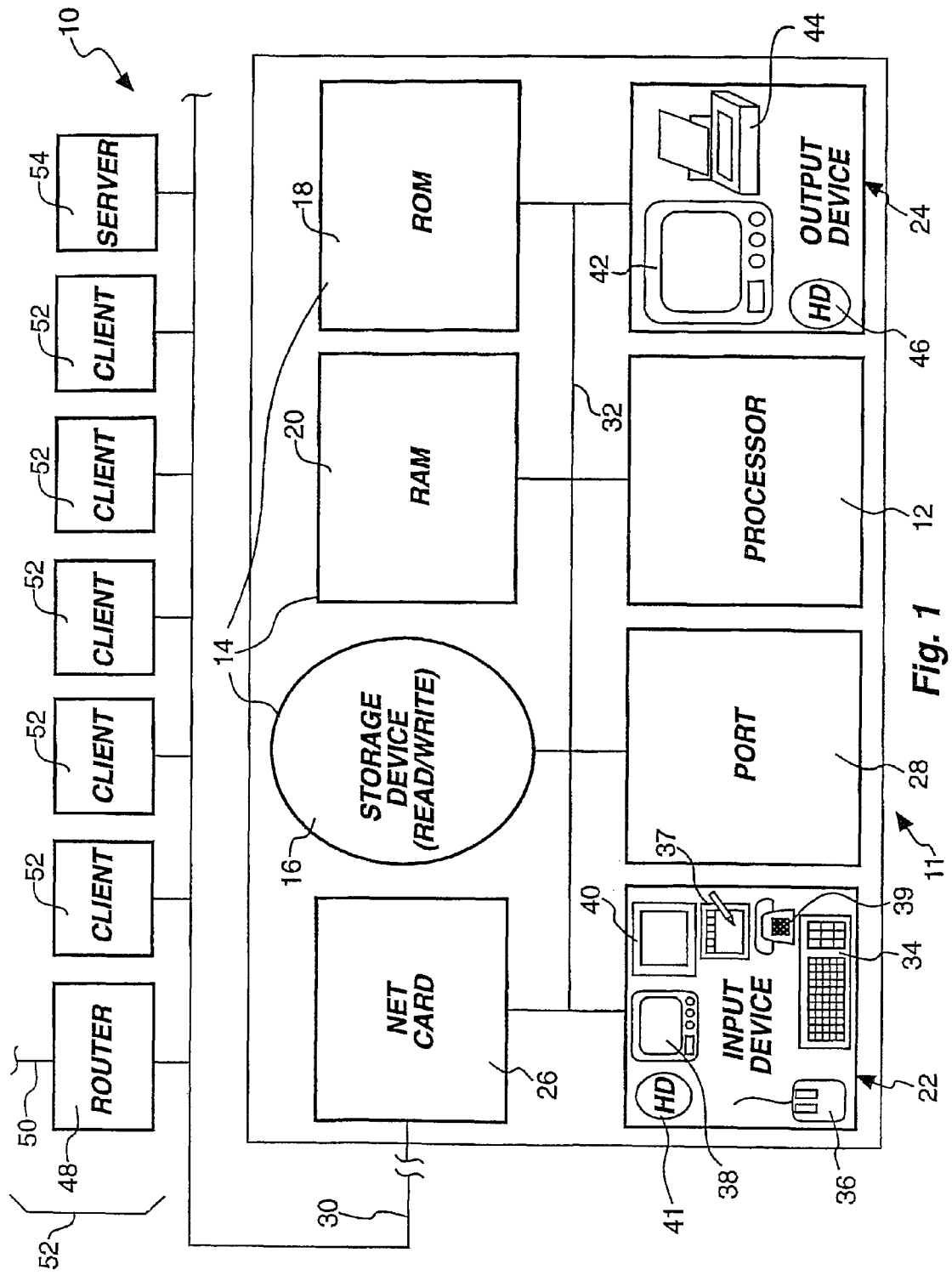
FIG. 1 is a schematic block diagram of an individual node in a network system.

Referring now to FIG. 1, a system 10 or network 10, such as the Internet, may include nodes 11 (e.g. nodes 50, 52, 54). Each node 11 may include a processor 12 and memory devices 14, such as storage devices 16, read only memory (ROM) 18, and random access memory (RAM) 20, sometimes referred to as operational memory. The node 11 may include a variety of input devices 22, and output devices 24 whether dedicated as illustrated in FIG. 1, or more generally available over a network.

Typically, a node 11 may include a network card 26 for connecting to a network 30 (e.g. network 10) outwardly, and a bus 32 for interconnecting elements internally.

Input devices 22 may include a keyboard 34, a mouse 36 or other pointing device 36 such as a stylus or graphics tablet, an interactive touch screen 38, a scanner 40, or even a storage device 41 for providing data to the node 11. Similarly, output devices 24 may include monitor 42, printer 44, storage devices 46, and the like for providing data from the node 11.

A router 48 may interconnect networks 30, 50 where each network 30, 50 may include some simple nodes 52, such as clients 52a-52d, and servers 54. Networks 30, 50 are well understood in the art. Accordingly, the hardware illustrated is by way of example, and not limitation as to the hardware suite on which the invention may be implemented. More or less equipment may be used in many particular embodiments.

The system 10 is the datastore or database from which information is to be obtained. However, the system 10 need not be configured as shown in FIG. 1. For example, the system 10 may be a datastore or database contained on a single computer. However, many of the subsequent descriptions will refer to the system 10 as a distributed network 10 of computers, such as the Internet.

Figure 2:
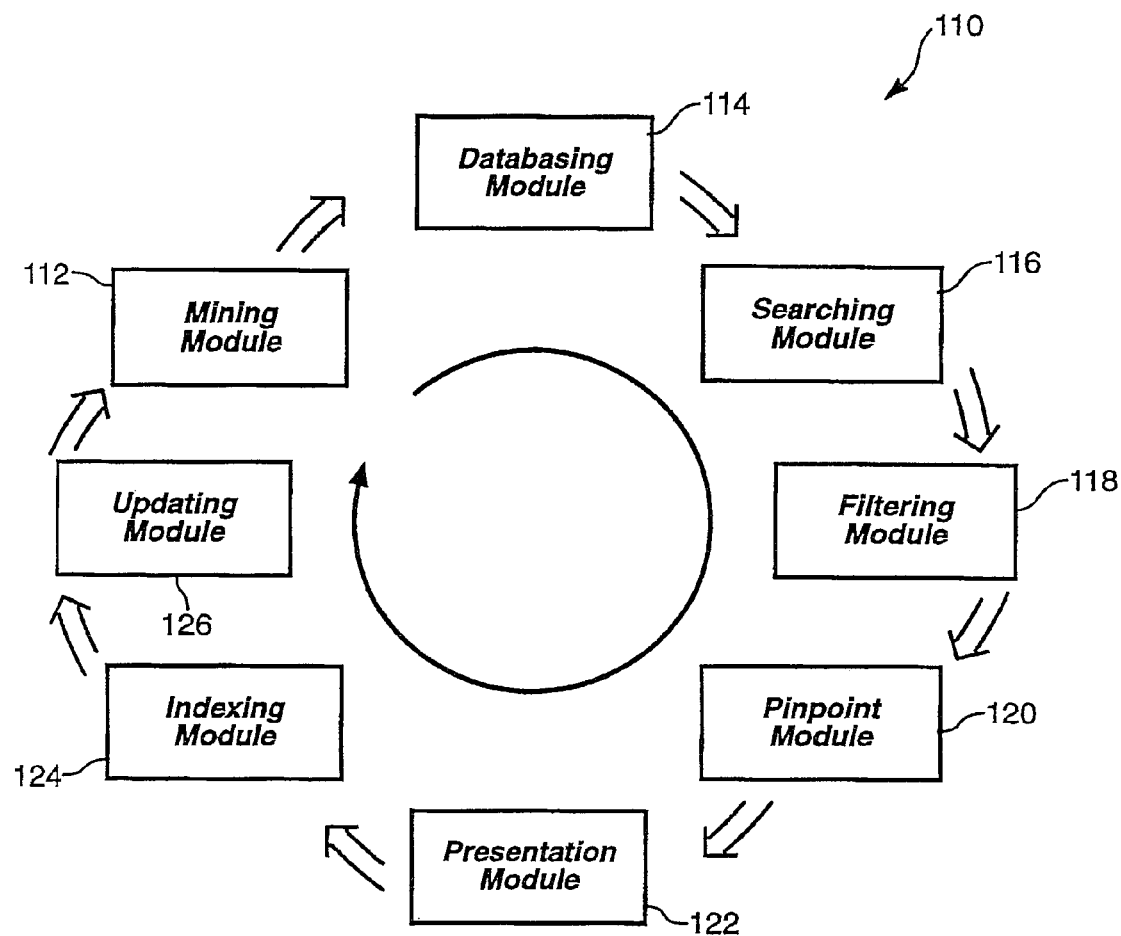
FIG. 2 is a schematic block diagram of one embodiment of a data extraction tool on a server, such as the server of FIG. 1.

FIG. 2 shows one embodiment of a data extraction tool 110, or tool 110, with its associated modules. A mining module 112 gathers information from a data source, preferably the Internet. A databasing module 114 categorizes and sorts information within a local database. This information can be actual data directly from the data source, or it can be simply pointers to locations of data within the data source.

An input module 116 interfaces with a user to receive a request for information. A filtering module 118 filters information to isolate the data most relevant to a user's request. A pinpointing module 120 locates and returns identification of the exact location of information. A presentation module 122 presents information summaries and locations to a user. An indexing module 124 organizes information for use and access by a user. An updating module 126 automatically updates information in a local database.

The arrows in FIG. 2 show a general chronological flow. However, the modules shown do not have to be accessed in the order shown. In addition, modules can operate multiple times. For example, the updating module 126 may utilize the mining module 112 to obtain more information, which may then be shown to a user by the presentation module 122 and stored by the indexing module 124.

Figure 3:
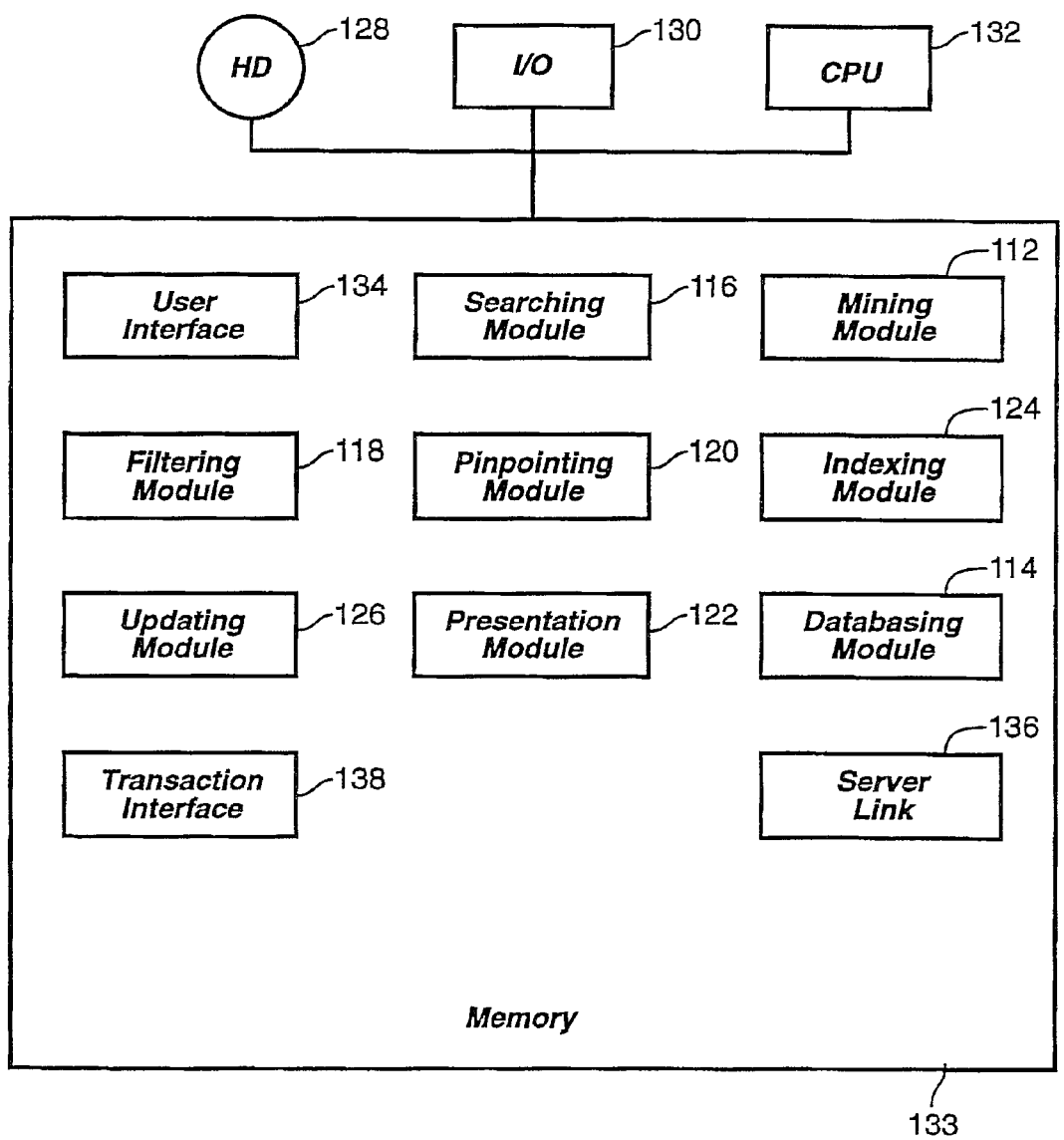
FIG. 3 is a schematic block diagram of a data extraction tool, as shown in FIG. 2, configured for use with a node in a network system, as shown in FIG. 1.

Referring to FIG. 3, a node 11 may have a hard disk 128 or HD 128, an input/output port 130 or I/O 130, a central processing unit 132 or CPU 132, and a memory 133. The modules 112, 114, 116, 118, 120, 122, 124, and 126 may be temporarily stored for use in the memory 133, permanently stored in the hard disk 128, and processed through the central processing unit 132. A user interface 134 and a server link 136 provide for communication with a user and with the network 10 via the I/O 130. A transaction interface 138 may also be included to permit purchasing and selling over the network 10.

Figure 4:
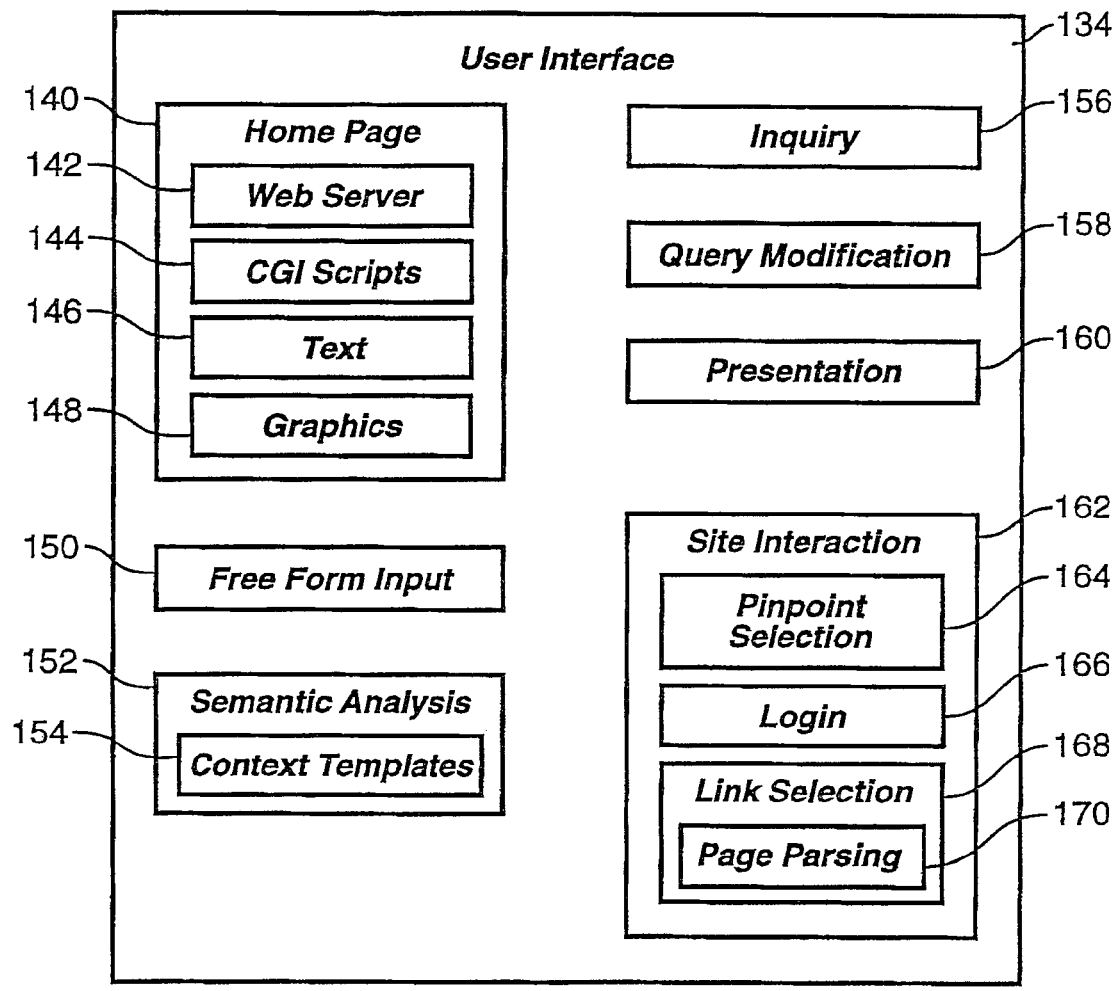
FIG. 4 is a schematic block diagram of data structures for administering and executing a user interface in accordance with the invention.

FIG. 4 shows some data structures that may be included in the user interface 134. A home page 140 provides a user with access to the node 11 with the data extraction tool 110. A web server 142 stores data that makes up the home page 140. CGI scripts 144 may display data from the web server 142 for a user in the form of text 146 and graphics 148.

A free form input module 150 receives searching parameters, in the form of a query, from a user. A semantic analysis module 152 parses the query and uses context templates 154 to develop a list of contexts that may correlate to information desired by a user. An inquiry module 156 prompts a user for further guidance concerning which of the available contexts are truly relevant. A query modification module 158 modifies the query to suit a user's response to prompting from the inquiry module 156. A presentation module 160 displays search results in a clear fashion for a user, and can also permit a user to interact with other nodes (e.g. nodes 50, 52, 54) where further information may be stored.

In addition, a site interaction module 162 can permit partial processing of information by the data extraction tool 110 before presentation to a user. A pinpoint selection module 164 chooses relevant sites for further processing. A login module 166, if needed, may permit the site interaction module 162 to automatically log onto a site where relevant information is stored. A link selection module 168 chooses the most relevant path within the site for retrieval of the desired information. A page parsing module 170 determines whether text from the site is relevant to a user's query.

Figure 5:
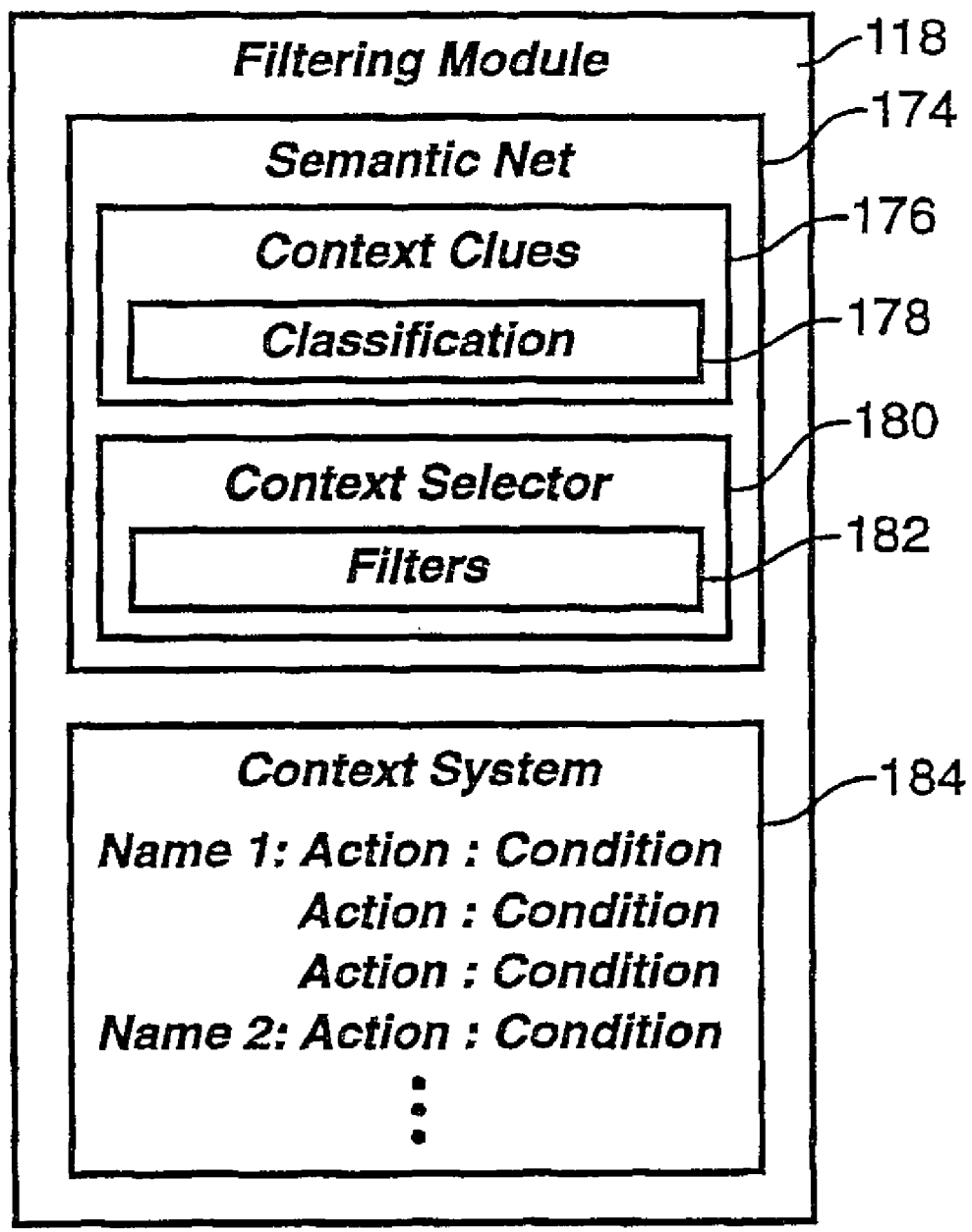
FIG. 5 is a schematic block diagram of data structures for administering and executing a filtering module in accordance with the invention.

Referring to FIG. 5, some data structures that may be used in the filtering module 118 are shown. The semantic net 174 is a resource for matching query text from a user to text from a web site. Context clues 176 provide information for contextual comparisons based on classifications 178 of contexts in which a word may be found. A context selector 180 selects those contexts that correlate to the proper context for the query and isolates them via filters 182. The filters 182 may reference the context system 184, which simply provides a list of actions corresponding to each instance of a word. For example, the context system may specify that a site should be retained if a keyword is found in a certain context within the site, but that the site should be filtered out if the keyword is used in a different context.

Figure 6:
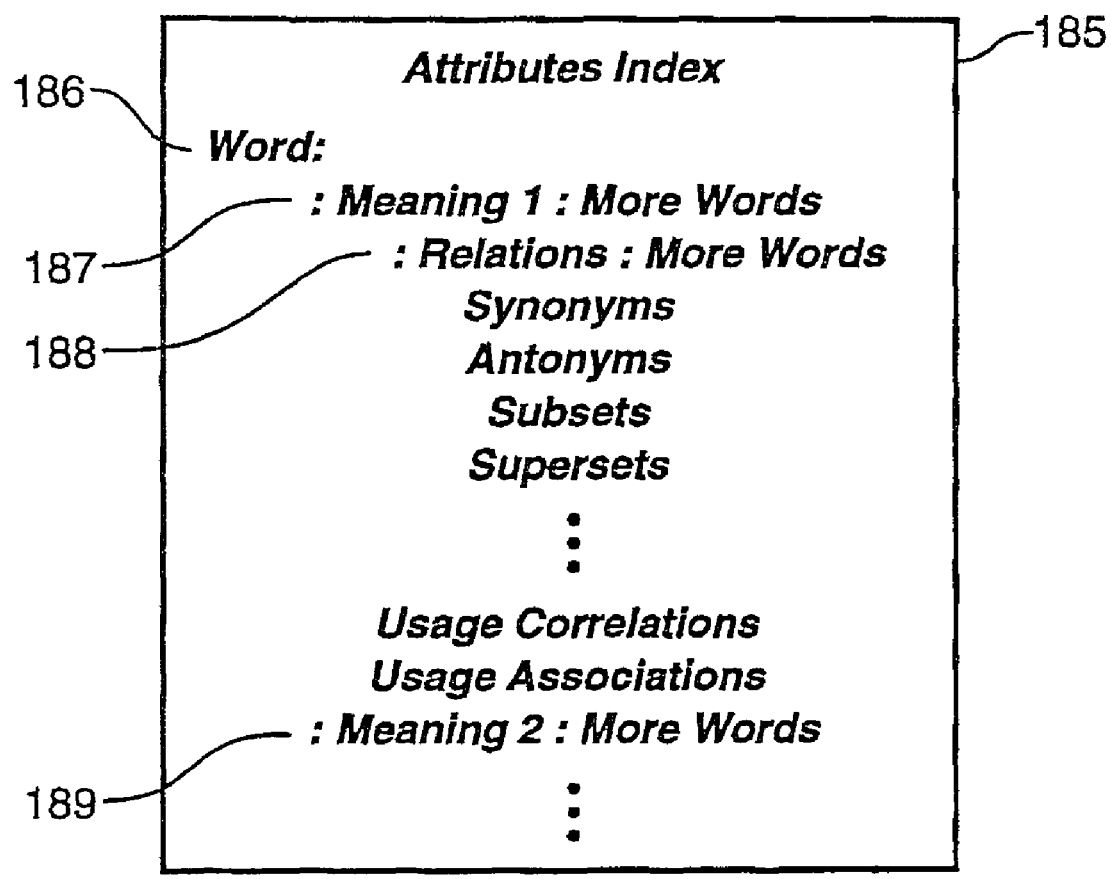
FIG. 6 is a schematic block diagram of data structures for administering and executing an attributes index in accordance with the invention.

Referring to FIG. 6, the context clues 176 and the context selector 180 may reference an attributes index 185. The attributes index 185 contains a list of words 186. Each word has at least one meaning 187 indexed to that word, and each meaning 187 has a list of relations 188, such as synonyms, antonyms, subsets, supersets, usage correlation, and usage association. A second meaning 189, and however many meanings exist for the word 186, may also be included with an associated list of relations.

The relations 188 provide context clues 176 so that a given web site can be classified by context. The context may be determined, for example, by the frequency and combination of relations 188 that appear within the web site. Thus, the filters 182 can filter out those web sites in which the proper keyword is used in an irrelevant context.

Figure 7:
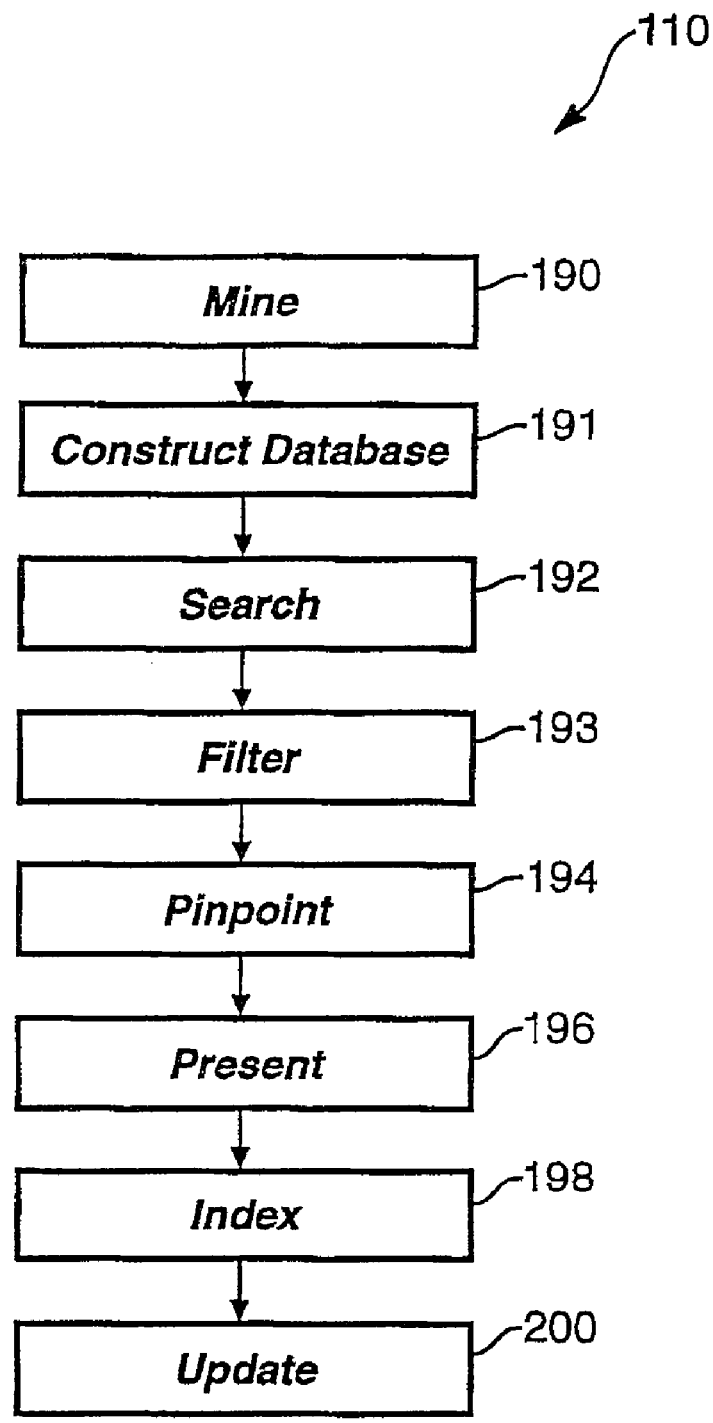
FIG. 7 is a schematic block diagram of methods for implementing one embodiment of the data structures and functions of FIG. 2 in accordance with the invention.

FIG. 7 shows one method for implementation of the data structures of FIG. 2. In a mining step 190, a data extraction tool 110 mines information from the network 10. The locations of the information, and possibly some of the information itself, may be compiled and formatted in a database construction step 191. A searching step 192 permits a user to query for information stored by the database construction step 191. A filtering step 193 selects the information most relevant to a user's query. A pinpointing step 194 determines the exact location of the relevant information on the network 10. A presenting step 196 organizes relevant information and provides it to a user. An indexing step 198 links relevant information to the location of that information on the network 10. An updating step 200 subsequently performs an automatic search of the network 10 for new information relevant to the user's query.

Figure 8:
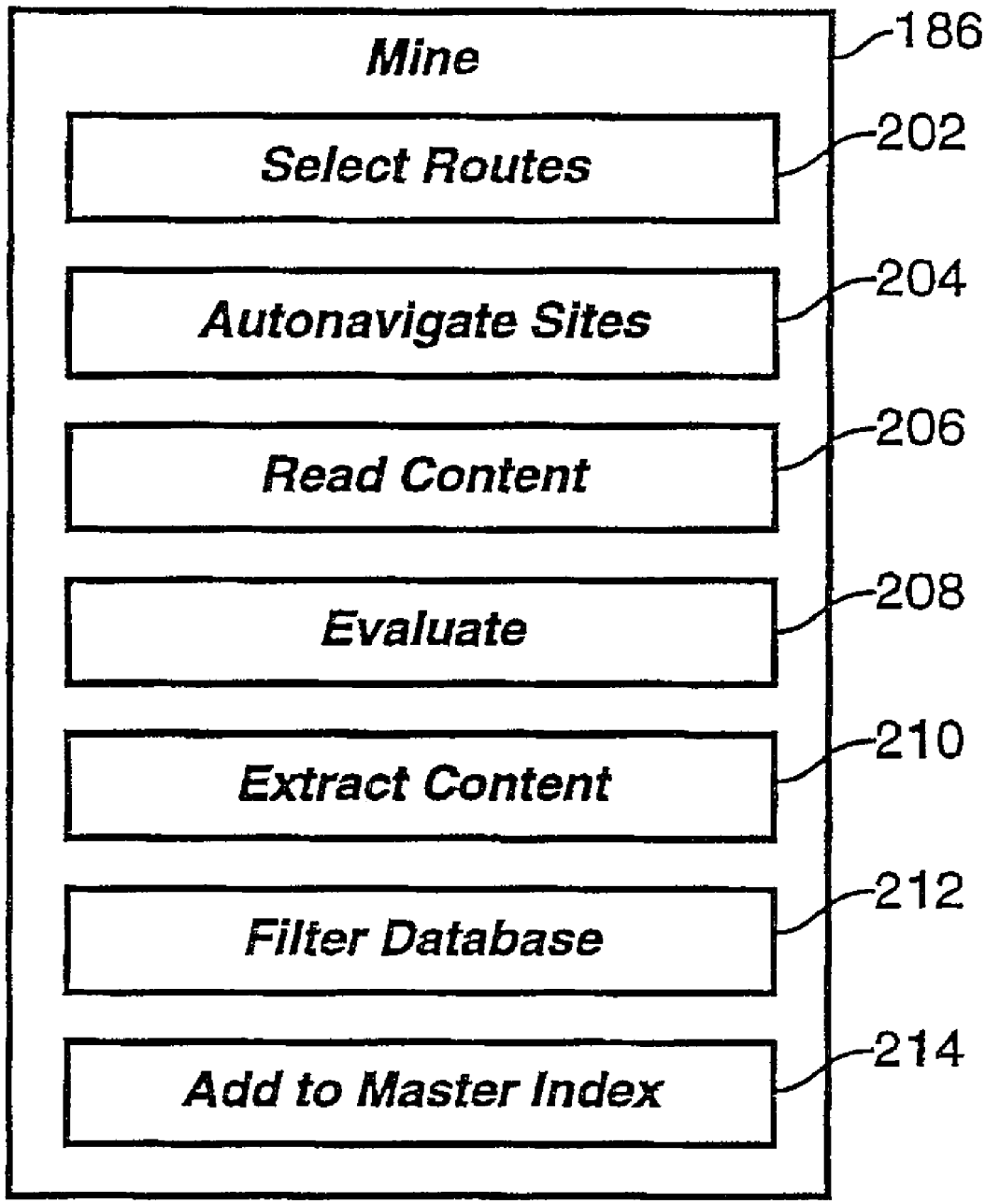
FIG. 8 is a schematic block diagram of methods for implementing one embodiment of the mining step of FIG. 7 in accordance with the invention.

FIG. 8 shows possible steps that might be included within the mining step 190. In a route selection step 202, the tool 110 chooses an orderly method for processing information from the network 10. Preferably, the route selection step 202 involves an orderly progression to ensure that each potentially relevant parcel of data is processed once and only once. In an auto navigation step 204, the tool 110 receives information from the network 10 for processing in a content reading step 206.

In an evaluation step 208, the tool 110 evaluates the potential relevance of the text 146 of a site to future queries of a user. The tool 110 may be directed towards acquiring a certain type of information, or broadly used to obtain and categorize a wide variety of data. The scope of data to be mined determines how selective the evaluation step 110 will be. In a content extraction step 210, potentially relevant content is compared against a listing of needed information to further filter it in a database filtration step 212. The data are indexed for ready access by an addition to a master index step 214.

Figure 9:
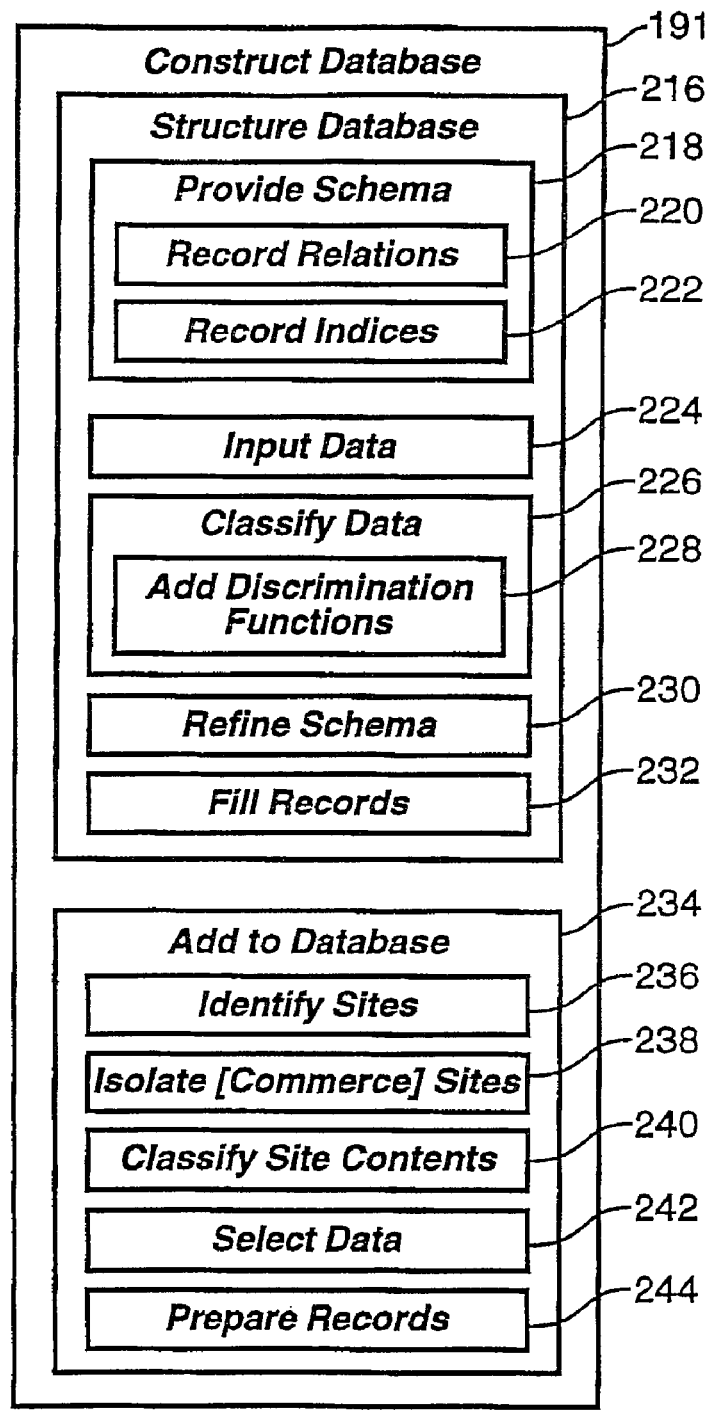
FIG. 9 is a schematic block diagram of methods for implementing one embodiment of the database construction step of FIG. 7 in accordance with the invention.

FIG. 9 shows possible steps that might be included within the database construction step 191. A database structuring step 216 provides the structure and organization for the information. In a schema provision step 218, a relations recording step 220 and an indices recording step 222 organize data into fields that are appropriately linked together and indexed for rapid reference. In an input data step 224, the tool 110 receives information gathered during the mining step 186.

A data classification step 226 uses discrimination functions 228 to categorize information within the schema developed by the schema provision step 218. A schema refining step 230 permits revision of the schema as needed to accommodate information that otherwise cannot be appropriately categorized within the schema. In a records filling step 232, the tool 110 adds data to form records.

In an addition to database step 234, the tool 110 adds data retrieved by the mining step 186 to the local database. This involves a number of steps. In a site identification step 236, the tool 110 identifies sites of relevant information. In a site isolation step 238, the tool 110 further filters sites based on criteria provided by a user or by the programming of the tool 110. For example, the tool 110 can be programmed to isolate sites capable of conducting commerce over the Internet. In that case, the site isolation step 238 would filter out all sites without a method for conducting commerce through the site. In a site contents classification step 240, the tool 110 classifies data into appropriate categories, as laid out in the schema. A data selection step 242 chooses classifiable data for transmission to a record preparation step 244, where data is added to records in the local database.

Figure 10:
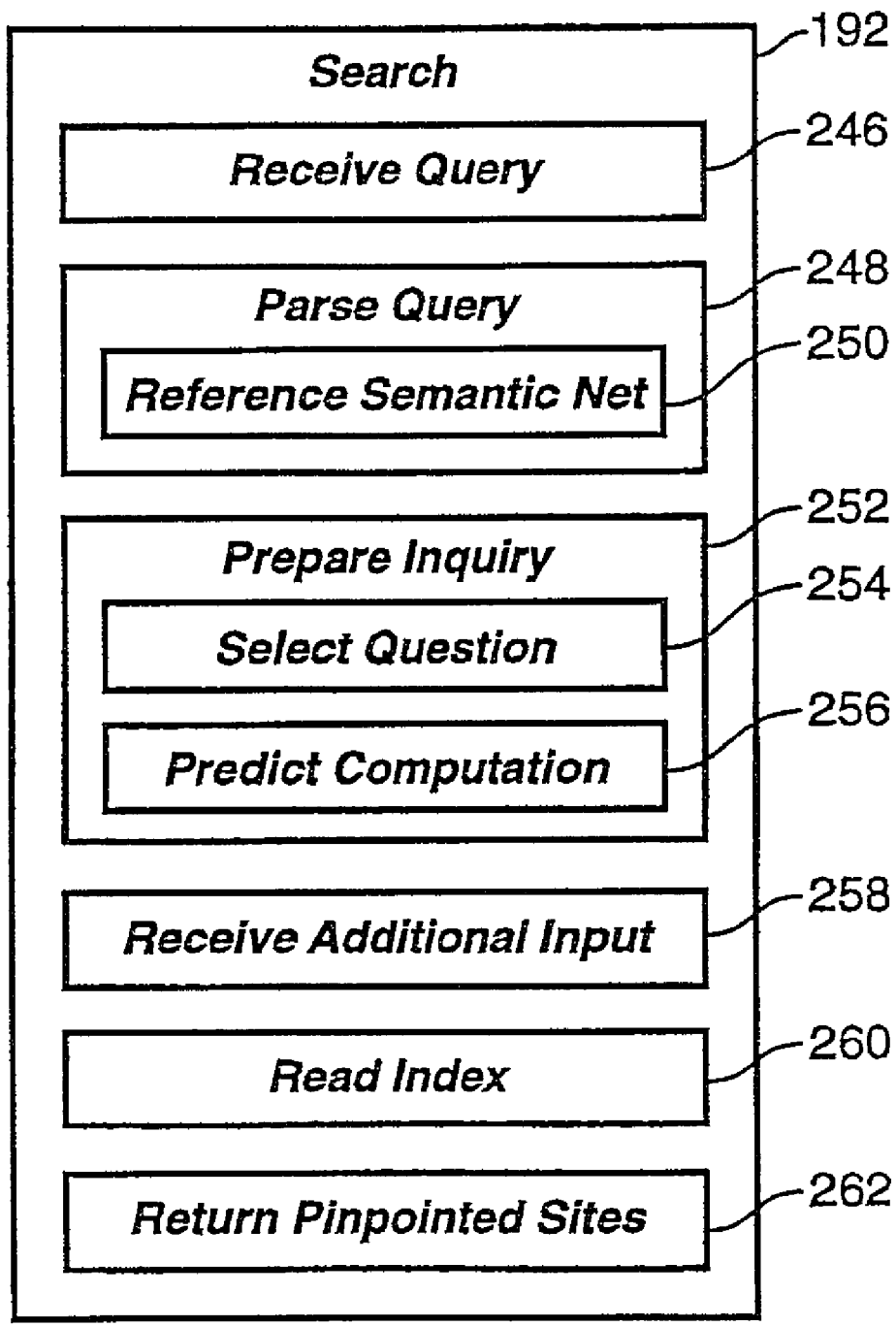
FIG. 10 is a schematic block diagram of methods for implementing one embodiment of the searching step of FIG. 2 in accordance with the invention.

Referring to FIG. 10, a number of steps may be included within the searching step 192. A user may request information by entering free form text or other query inputs in a query receiving step 246. In a query parsing step 248, the query is compared against a list of possible contexts by a semantic net reference step 250. In an inquiry preparation step 252, the tool 110 forms a question for a user, in a question selection step 254, to ask for clarification concerning which of the potential contexts that may match the query is the most relevant.

The inquiry computation step 256 may provide an estimate of the time required to perform a search for each potential context, so that a user will know how long the tool 110 will take to process a search for a given context. This is especially helpful when a user has provided a very broad query. In such a case, the computation time will be high, so a user will know that the search will take a comparatively long time and provide a comparatively large amount of information, perhaps more than desired.

In an additional input receiving step 258, the tool 110 receives more text or menu selections from a user to identify which of the context or contexts are desired for searching. In an index reading step 260, the tool 110 reads an index of information contexts created in conjunction with the database construction step 191. The relevant context or contexts in the index are linked to site locations for information. The tool 110 returns these site locations to a user in a pinpointed sites returning step 262.

Figure 11:
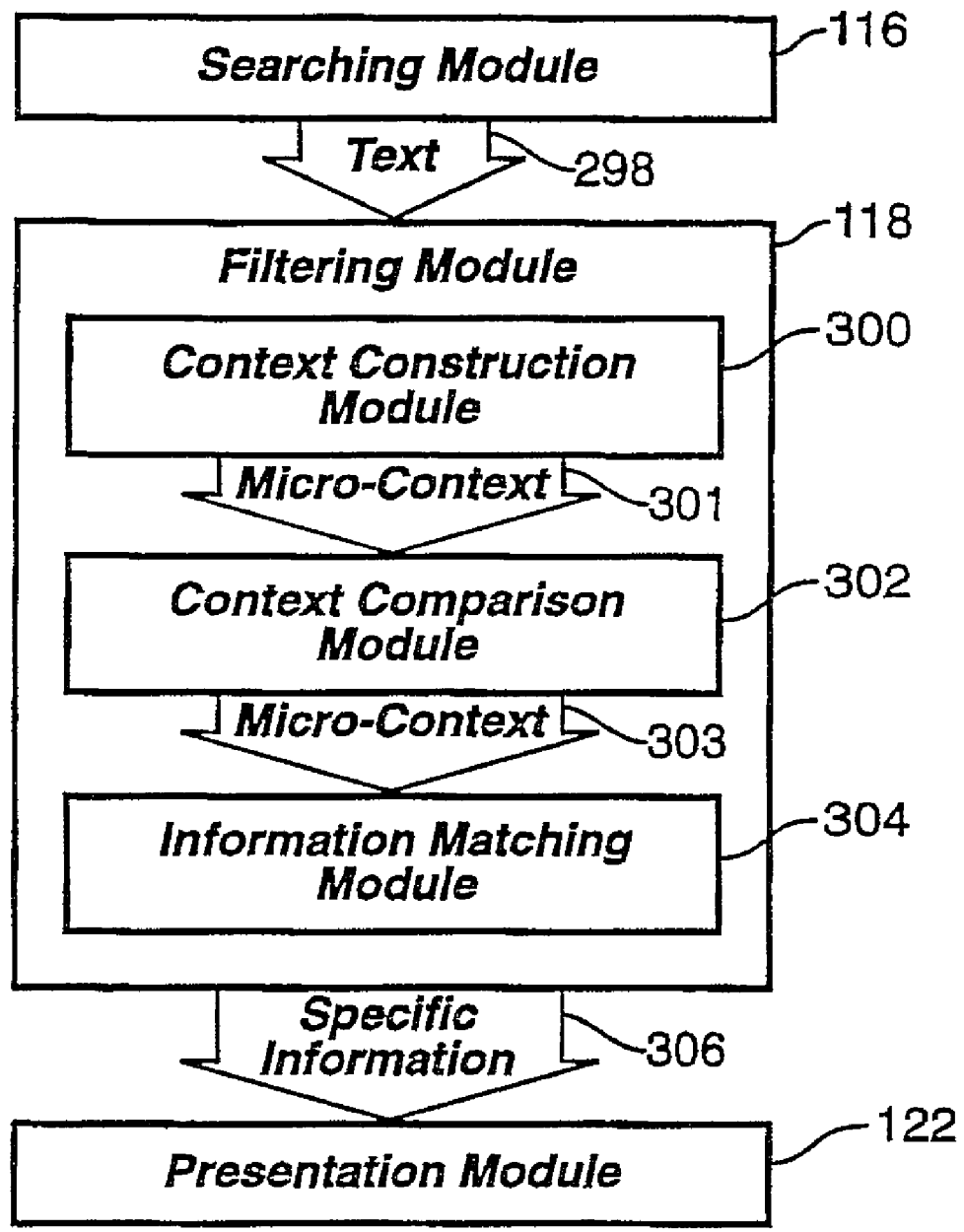
FIG. 11 is a schematic block diagram of an alternative method for implementing the data structures and functions of FIG. 2.

Referring to FIG. 11, the searching and filtering modules may alternatively be embodied as shown in FIGS. 11 through 14, in contrast to the configurations shown in FIGS. 5, 6, and 10. As above, the input module 116 may transmit text 117 reflecting a search query to the filtering module 118, which may then filter information to isolate what a user is seeking. In this embodiment, the filtering module 118 includes a context construction module 300 for assembling micro-contexts 301 based on the text 117, a context comparison module 302 for converting the micro-contexts 301 to macro-contexts 303, and an information matching modules 304 for matching the macro-contexts 303 to specific information 306 responsive to the user's query. The presentation module 122 again provides the information to a user.

The input module 116 may acquire text to describe information sought by a user in a variety of different ways. For example, a simple free form text search may be used, wherein the user types a query in plain language. Alternatively, a user may provide key words separated by operators such as and, or, not, and others known in the art. The input module 116 may be configured to refine the text through questions to be answered by a user. The filtering module 118 then receives the text from the input module 116. Until processed, the text is only a series of words with no inherent meaning to a computer. The filtering module 118, in this embodiment, will convert the text into searchable portions to find matching information of the type desired by a user.

Figure 12:
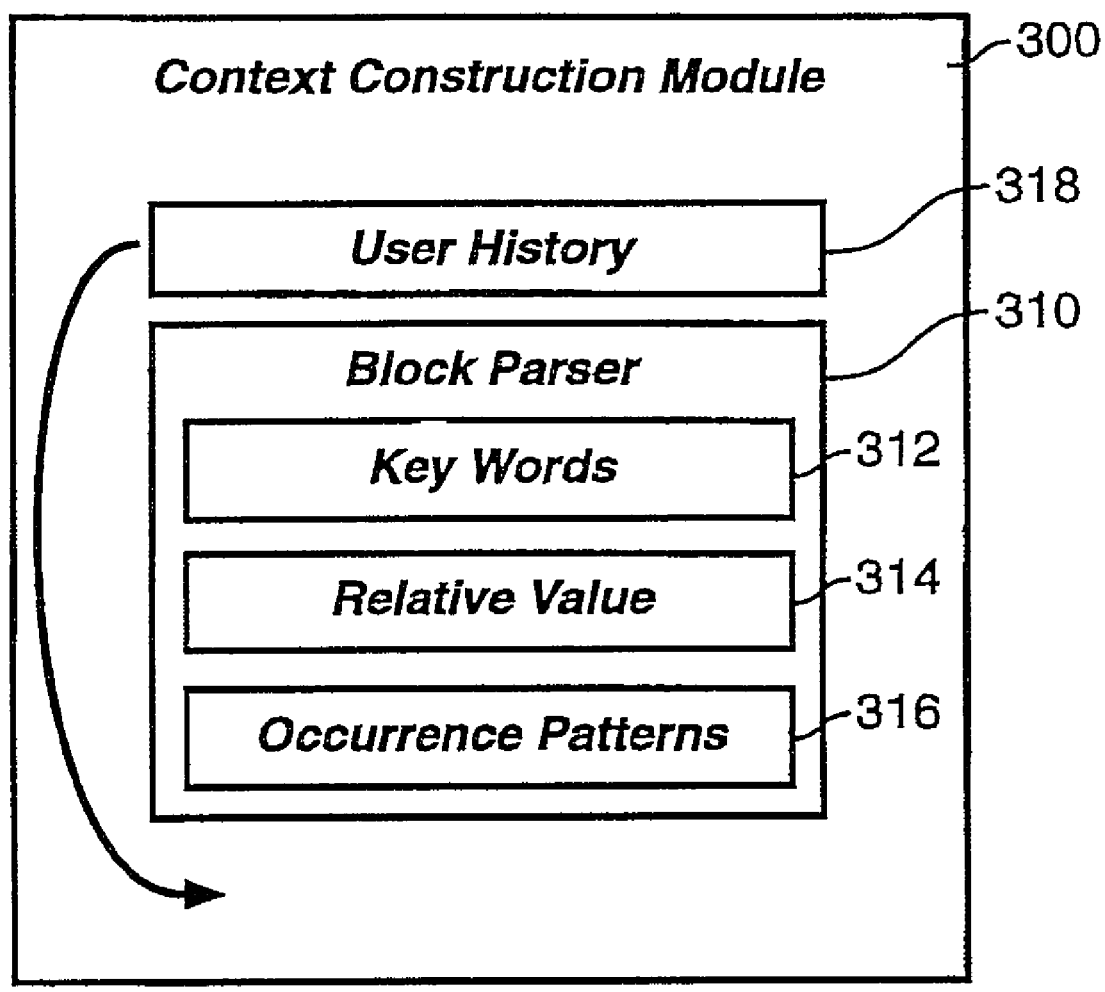
FIG. 12 is a schematic block diagram of methods for implementing one embodiment of the context construction module of FIG. 11 in accordance with the invention.

Referring to FIG. 12, the context construction module 300 is shown in greater detail. The context construction module 300 assembles the words to form small, coherent groups, or micro-contexts 301, for examples, they may contain about 1 to 5 words. This is accomplished in part by using a block parser 316, which breaks down and interprets the text. The text can be broken up by the block parser 300 in a number of different ways. Key words 312 and their modifiers, if designated by a user, can form or define natural contexts for searching. Similarly, relative values 314 or priorities assigned to words in the text may be used by the block parser 310 to create micro-contexts 301. Occurrence patterns 316 may be used to form natural separations between groups of words.

These occurrence patterns 316 may be obtained from a user's history 318 corresponding to a given user's activities with the tool, including prior searches and results, or from a general language database such as the attributes index 185. The user history 316 in any case may provide the tool 110 with information concerning what information a user has requested in the past, and therefore what information the user is most likely looking for with a new inquiry.

Figure 13:
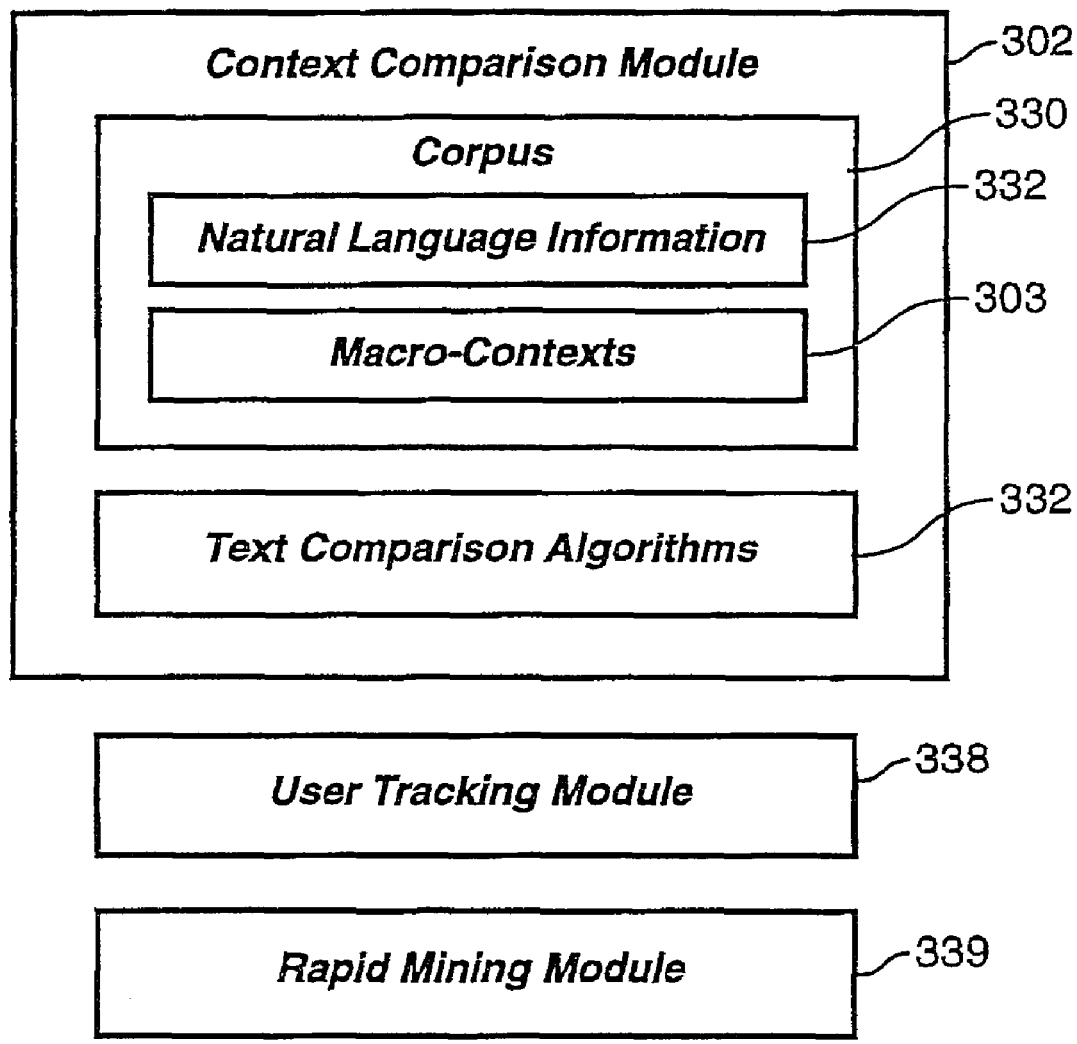
FIG. 13 is a schematic block diagram of methods for implementing one embodiment of the context comparison module of FIG. 11 in accordance with the invention.

Referring to FIG. 13, the context comparison module 302 is shown in greater detail. The context comparison module 302 receives the micro-contexts 301 from the context construction module 300 and compares them to a corpus 330 of information. The corpus 330 may simply be a database with samples of information 332 in natural language format, indexed according to macro-contexts 303. These macro-contexts 303 may be more specific than the micro-contexts 301.

The corpus 330 is sized to suit the amount and type of information on the network 10. The corpus 330, for example, may be composed of portions of text from 100,000 to 200,000 web sites, or more, with each portion matched to a macro-context 303. The entire corpus 330 may be between 10 Megabytes and 10 Gigabytes in size, or larger. A text comparison algorithm 336 may be provided to match text from the corpus 330 to the micro-contexts 301, and then return the corresponding macro-context 303. The text comparison algorithm 336 may combine several micro-contexts 301 to permit a more specific search, thereby narrowing the number of matching macro-contexts 303.

Ideally, the context comparison module 302 will return a small number of macro-contexts 303. However, this may not be possible for two reasons. First, if multiple, important, micro-contexts 301 are identified by the context construction module 300, they might not appear together within any portion of the corpus 330. In such a case, the context comparison module 302 may return a series of macro-contexts 303 that match some fraction of the important micro-contexts 301. Although these macro-contexts may not precisely match a user's query, they may be ranked in order of likelihood that they will be relevant to the user. The ranking may be obtained by using the user history 318 and other factors, such as the number, probability, or nature of prior requests of the macro-context 303 by other users, to determine the probability that a given macro-context 303 is relevant to the user.

Alternatively, the micro-contexts 301 may not even be found in the corpus 330. In that case, a user may be referred to a user tracking module 338, which provides a user with portals to access and search the network 10 directly. The user tracking module 338 permits the tool 110 to track a user's progress through the network 10 to obtain further context information for the current search, acquire more general information regarding contexts important to the user, or find important information not currently present within the corpus 330.

A rapid mining module 339 may also be accessed while the user tracking module 338 is operating, to add nodes 52, or sites 52, to the corpus 330 and to process them through the databasing module 114 "on the fly," or while the user is accessing the tool 110. These may be sites 52 visited by the user or suggested by the user's query.

After searching the network 10 through the user tracking module 338, a user may once again be referred to the input module 116 in order to provide additional text inputs, or the context comparison module 302 may resume operation to process the micro-contexts 301 through new additions to the corpus 330.

Figure 14:
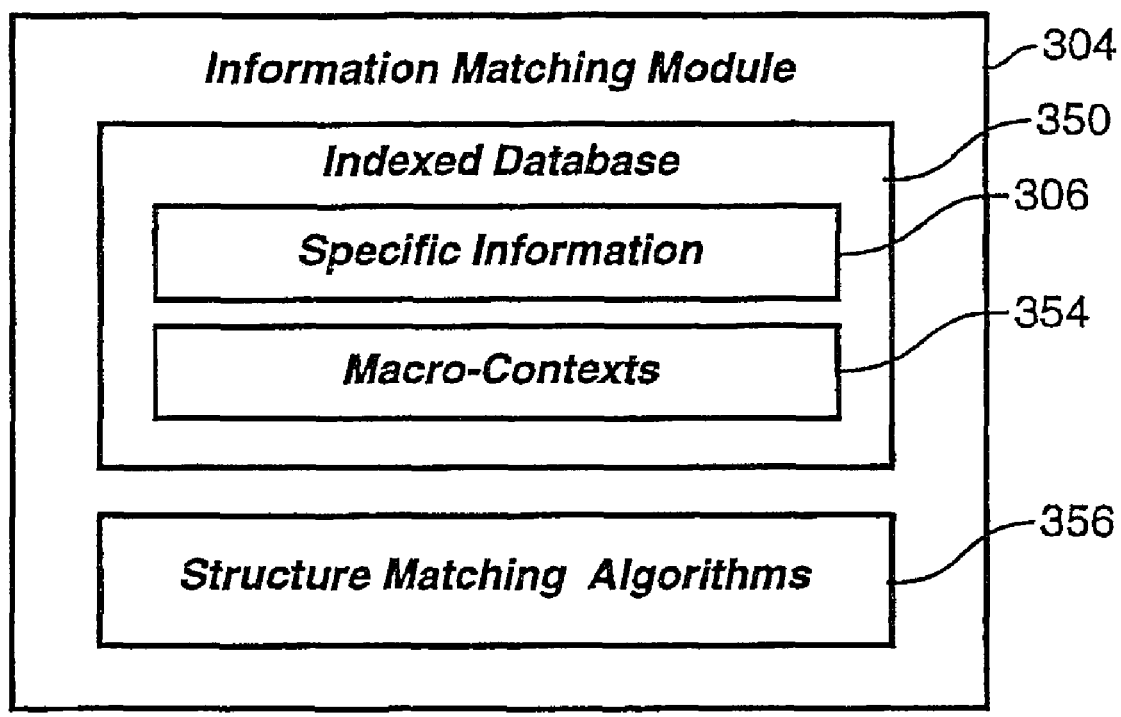
FIG. 14 is a schematic block diagram of methods for implementing one embodiment of the information matching module of FIG. 11 in accordance with the invention.

Referring to FIG. 14, the information matching module 304 receives macro-contexts 303 from the context comparison module 302 and compares them to an indexed database 350. The indexed database 350 contains specific information 306 of the type desired by the user, indexed by macro-contexts 354 identical or similar to those provided by the context comparison module 302. Thus, using a structure-matching algorithm 356, the information matching module 304 can find the portion of specific information 306 that correlates to the macro-contexts 303 provided by the context comparison module 302. The specific information 306 located by the information matching module 304 may then be returned to the presentation module 122 to be presented to a user.

The presentation module 122 is preferably flexible in its operation. For example, the depth and breadth of specific information 306 returned may be varied according to a user's preferences. Once the specific information 306 is located within the indexed database 350, proximate information is easily gathered and returned. The order and arrangement of specific information 306 displayed may also be determined manually by a user or automatically by reference to the user history 318.

Figure 15:
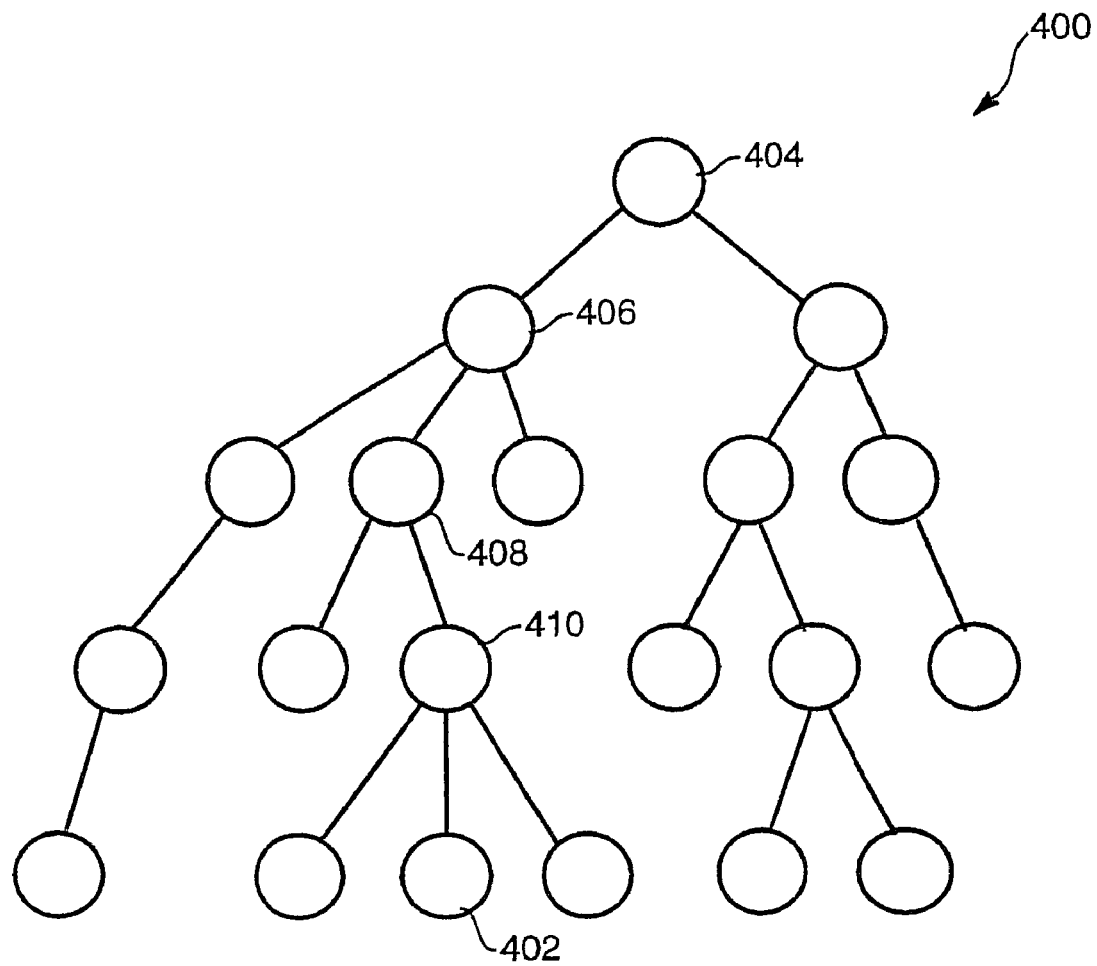
FIG. 15 is a schematic diagram of a hierarchical database usable in conjunction with the present invention.

Referring to FIG. 15, the indexed database 350 may be structured as a hierarchical database 400. The hierarchical database 400 is configured like a tree, with general information at the top and more specific information below. A parcel of information 402 desired by a user is a specific portion, and is therefore near the bottom of the hierarchical database 400. According to traditional methods prior to the current invention, a user would locate the parcel of information 402 by navigating through the broadest classification 404 and through the branches 406, 408, and 410. A user might find this path difficult or even impossible to find, particularly if the user knows little about the parcel of information 402, the organizational scheme in which it resides, or the related elements in the hierarchy, and therefore little about where it should be classified.

The current invention permits a user to navigate straight across hierarchies to the parcel of information 402. The hierarchical database 400 remains transparent to the user, who need not familiarize himself or herself with the structure of the hierarchical database 400. Thus, the method disclosed herein provides horizontal navigation across a hierarchical database, in which the tool 110 intelligently determines exactly what the user is looking for and searches among the more specific, lower branches of the hierarchical database 400 to find it.

One application of such a hierarchical, searchable database is to provide information about products for sale over the Internet. In such a case, the presentation module 122 ultimately returns words to the user to denote the various products in the hierarchical database 400 that match the user's request. The presentation module 122 may, for example, be configured to sort products matching the user's request by brand, model, specifications, price, merchant, availability, distance to the merchant from the user, shipping cost, or any number of other relevant parameters.

In addition, the login module 166 may operate to navigate a site 52 for a user, including forms presented by the site 52 to collect information from the user. Thus, not only is a user freed from the need to navigate the hierarchical database, the user may also be permitted to access the site 52 and conduct business on it without having to navigate the structure of the site 52.

The tool 110 as configured above is also well adapted for use without such a hierarchical structure. The context matching capabilities of the tool 110 make the tool 110 effective for improving the relevance and completeness of results to a query, regardless of what formats are used by the tool 110 to maintain and organize a local database. This is a vast improvement over current search engines, which typically search only for the exact text provided by the user, and thus deliver results that include irrelevant items and fail to include important information.

Figure 16:
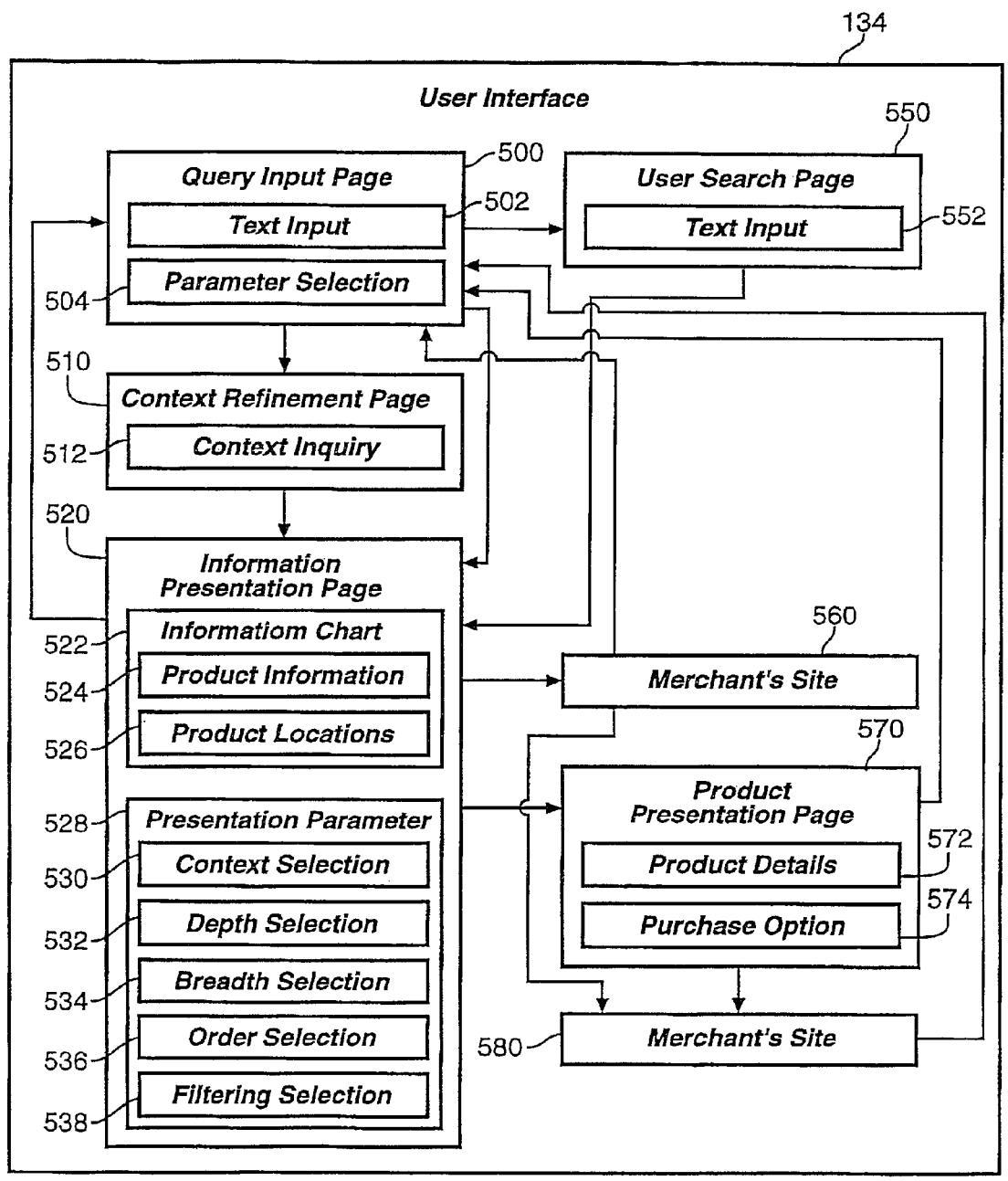
FIG. 16 is a schematic block diagram of a possible embodiment of a user interface according to the present invention.

Referring to FIG. 16, an alternative and more detailed embodiment of the user interface 134 is shown. A user may first be directed to a query input page 500, in which the user may provide text descriptive of the desired information in a text input module 502. The text input module 502 may receive text in natural language form, i.e. as a sentence or question, or may be configured to accept keywords separated by operators, such as "and," "or," and "not." A parameter selection module 504 permits a user to adjust various parameters for the search from the outset, such as the amount and type of results to display. A user is not required to select categories of the information desired through menu structures.

Once a user has provided the text, the filtering module 118 operates substantially in the background, such that a user is not aware of its operation. However, as the filtering module 118 identifies relevant contexts, multiple potentially relevant macro-contexts 303 may be identified. Thus, the tool 110 may transmit a context refinement page 510 to a user, in which a context inquiry module 512 permits a user to select which macro-context 303 is most relevant. The tool would then transmit an information presentation page 520 containing information about the chosen macro-context 303.

Alternatively, the tool 110 may take a user directly from the query input page 500 to the information presentation page 520. The information presentation page 520, as embodied in FIG. 16, contains an information chart 522 with product information 524 of the type desired by a user, as well as product locations 526 showing where a product may be purchased on the Internet. The product information 524 may include items relevant to a user, such as the manufacturer, model, SKU number, price, availability, shipping cost, and relevant characteristics of each product. The product locations 526 may take the form of links to take a user directly to a site where a given product may be purchased.

Additionally, the information presentation page 520 may contain presentation parameters 526 that can be adjusted by a user. For example, a user may alter the context to select different products with a context selector 530, adjust the depth to include more products in the search with a depth selector 532, increase the breadth of the search to include a wider variety of products with a breadth selector 534, alter the order in which products are presented in the information chart 522 with an order selector 536, and more specifically define which products are shown in the information chart 522 with a filtering selector 538.

It is possible that the tool 110 may not find any products matching a user's query. In that case, the tool 110 may transmit a user search page 550, which permits a user to search the Internet directly from within the user interface 134. An additional text input module 552 may be provided to permit a user to input different text for a general search of the Internet. As the tool 110 searches the Internet, the tracking module 338 operates in the background to follow and gather information from a user's navigation. Thus, the tracking module 338 does not appear as part of the user interface 134. After a user searches the Internet, the tool 110 may take a user to the information presentation page 520 to present information gathered by the tracking module 338.

When a user finds a product and merchant of interest, he or she selects the appropriate product location 526, and the tool 110 may send a user to a merchant's site 560, where a user can obtain more information about the product and order it if desired. The merchant's site 560 may also be displayed within the user interface 134 of the tool 110, so that a user has not truly left the tool 110. The tool 110 may be configured to transmit the appropriate user information to the merchant's site 560 to "log in" a user and obtain access to information without requiring a user to fill out additional forms from the merchant's site 560.

Alternatively, the tool 110 may, itself, store additional information about the product and transmit it in the form of a product presentation page 570. The product presentation page 570 contains product details 572 and a purchase option 574, whereby a user may learn more about the product and purchase it as though at the merchant's site 560.

When a user chooses to purchase a product, either from the merchant's site 560 viewed through the user interface 134 of the tool, or from the product presentation page 570, using the purchase option 574, the tool 110 may respond by transmitting a purchase page 580. The purchase page 580 provides or obtains from a user additional information necessary to complete the transaction, such as shipping addresses and credit card numbers. Alternatively, the tool 110 may be configured to transmit this information automatically to the merchant's site 560. In any case, products are ordered through the merchants' site 560, whether through the purchase page 580 provided by the tool 110, or through the merchant's site 560 itself. A user may select, from the information presentation page 520, the merchant's site 560, the product presentation page 570, or the purchase page 580, to return to the query input page 500 for a new search.

Figure 17:
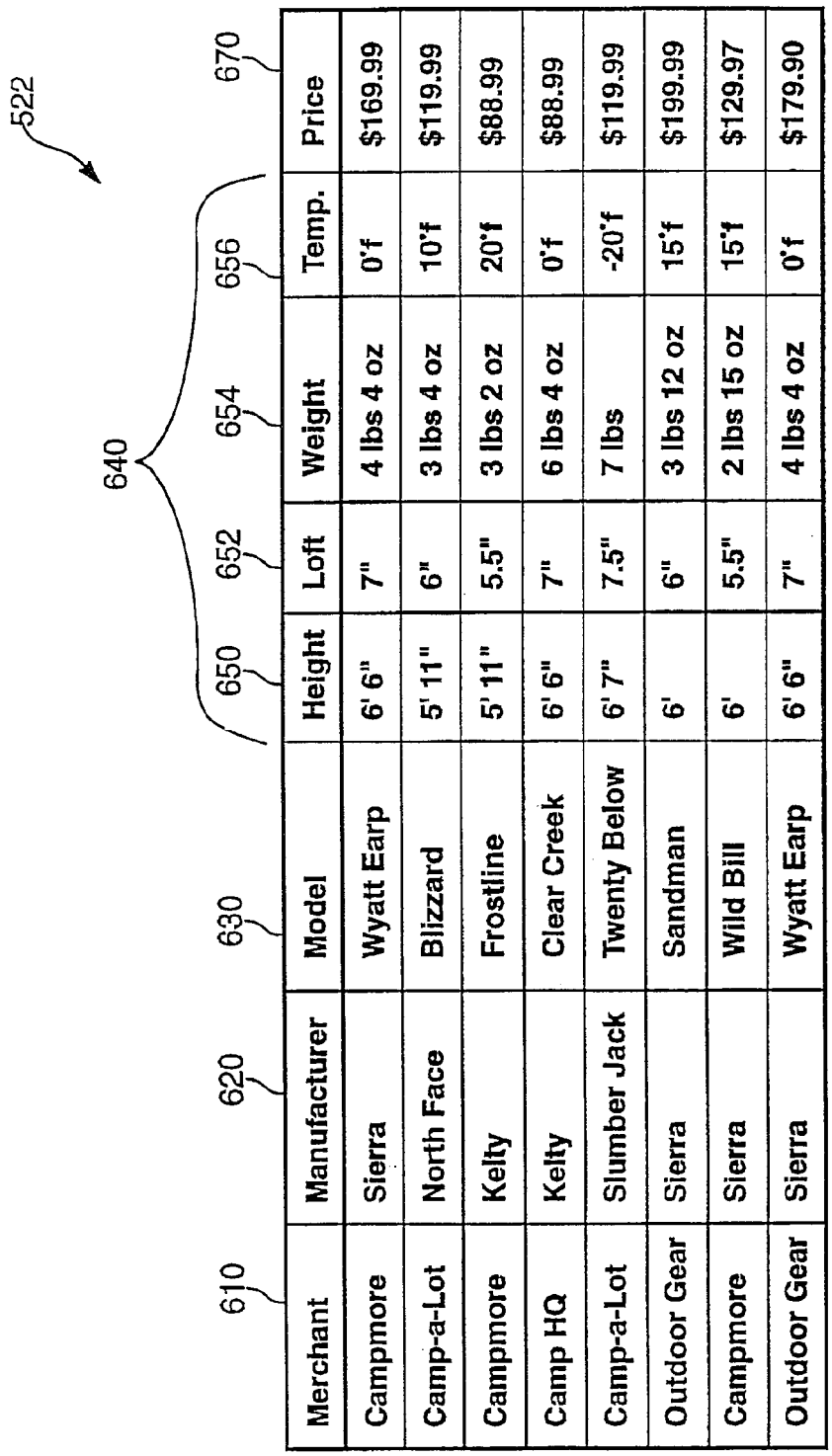
FIG. 17 is an exemplary information chart depicting how information may be presented to a user for modification and rearrangement, in accordance with the invention.

Referring to FIG. 17, an exemplary information chart 522 is provided. If a user were to submit a search for sleeping bags, results of the search may be similar to those shown in FIG. 17. The information chart 522 contains product information 606 arrayed with each product occupying a single row. Various attributes of each product are grouped by column, including the merchant 610 offering the product for sale, manufacturer 620, model 630, physical attributes 640 of the product, and price 670 of the product. The physical attributes 640 of the product are items of interest to a consumer, such as the maximum height 650 of a person able to use the sleeping bag, the loft 652, or thickness, of the bag, the weight 654 of the bag, and the lowest external temperature 656 for comfortable sleeping in the bag.

Since different users will be interested in different characteristics, the tool 110 provides the presentation parameters 528 to allow a user to alter what is shown in the information chart 522. For example, if a user were to decide that he or she would prefer an outdoor blanket, the context selector 530 may be used to effectively change the search to display similar results for outdoor blankets. A user may also use the depth selector 532 to show only broader product categories, such as manufacturers, product lines, or physical attributes 640. A user may, for example, choose to display only lowest external temperatures 656, to see the temperatures available without having to sort through several bags with the same lowest external temperature 656.

With the breadth selector 534, a user may choose to broaden or narrow the search, for example, to show both sleeping bags and outdoor blankets, or to show only sleeping bags from a certain manufacturer. The filtering selector 538 may offer a higher degree of control over what is displayed by allowing a user to select to include or exclude specific products or characteristics. With the order selector 536, a user may modify the order of results shown, for example, to show cheaper sleeping bags first, or to display lighter bags before heavier ones. The order selector 536 may permit a user to order by one attribute, then by another when the first attributes are equal. Thus, a user has full control over what the information chart 522 shows and how the information is grouped in the chart 522. A user can make a better and more rapid decision by discarding irrelevant information and properly arranging the remaining products.

From the above discussion, it will be appreciated that the present invention provides a data extraction tool for extracting information from an information source. Extracted information is cataloged and indexed for future searching by a user. Although not limited to commerce, the method disclosed herein may be adapted to search for commerce-ready web sites on the Internet.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method for extracting information accessible from at least one hosting computer over the Internet, the method comprising the steps of:
   providing a computer system executing a plurality of modules, each module of the plurality of modules being executable to instruct the computer system to complete a function corresponding thereto;
   mining, by a mining module, information from the Internet to form a database having a hierarchical schema;
   receiving, by an input module, text from a user as the exclusive form of user input, wherein the text is descriptive of the information sought;
   identifying, by a context selector module, a micro-context comprising a plurality of words corresponding to the information sought by the user, the plurality of words assigned a relative weighting based on information accessed by the user;
   acquiring, by the context selector module, a macro-context corresponding to the micro-context;
   locating, by a searching module, the information that matches the macro-context in a database; and
   presenting, by a presentation module, the information to a user.

2. A method for extracting information accessible from at least one hosting computer over the Internet, the method comprising:
   providing a computer system executing a plurality of modules, each module of the plurality of modules being executable to instruct the computer system to complete a function corresponding thereto;
   indexing, by an indexing module, information from the Internet to form a database indexed by macro-context, the macro-context characterizing the subject matter of corresponding information;
   receiving, by an input module, text from a user, the text being descriptive of information sought by the user;
   identifying, by a context selector module, a micro-context comprising a plurality of words corresponding to the information sought by the user, the plurality of words assigned a relative weighting based on information accessed by the user;
   acquiring, by the context selector module, a macro-context corresponding to the micro-context;
   locating, by a searching module, a subset of information in the database having a macro-context within a specified proximity to the macro-context of corresponding to the text; and
   presenting, by a presentation module, the subset of information to the user.

3. The method of claim 2, wherein the acquiring further comprises deriving from the plurality of words the macro-context characterizing the subject matter of the text.

4. The method of claim 2, further comprising tracking, by a tracking module, the user's navigation through the Internet.

5. The method of claim 4, further comprising identifying, by the context selector module, at least one macro-context characterizing content viewed by the user during the navigation.

6. A non-transitory computer readable storage medium storing computer executable code configured to perform a method, the method comprising:
   mining information from the Internet;
   organizing the information;
   forming a database having a hierarchical schema corresponding to the organizing;
   populating the database with the information;
   receiving text from a user, the text corresponding to information sought by the user;
   determining a micro-context comprising a plurality of words corresponding to the text received from the user, the plurality of words assigned a relative weighting based on information accessed by the user;
   determining a macro-context corresponding to the micro-context;
   locating, within the database, a subset of the information corresponding to the macro-context; and
   presenting the subset to the user.

7. The method of claim 6, further comprising combining relevant words in the text to form the micro-context.

8. The method of claim 7, wherein the locating further comprises searching through indices in the database indexed by macro-context.

9. The method of claim 8, wherein the macro-context corresponding to the micro-context characterizes the subject matter of the relevant words.

10. The method of claim 9, wherein the locating further comprises identifying a least one record within the database having a macro-context within a selected proximity to the macro-context corresponding to the micro-context.

* * * * *